(12) United States Patent
Lee et al.

(10) Patent No.: US 10,778,811 B2
(45) Date of Patent: Sep. 15, 2020

(54) PROTOCOL MODEL GENERATOR AND MODELING METHOD THEREOF

(71) Applicant: KOREA UNIVERSITY RESEARCH AND BUSINESS FOUNDATION, Seoul (KR)

(72) Inventors: Heejo Lee, Seoul (KR); Choongin Lee, Uijeongbu-si (KR); Jeong-Han Bae, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 154 days.

(21) Appl. No.: 15/955,104

(22) Filed: Apr. 17, 2018

(65) Prior Publication Data

US 2018/0309854 A1    Oct. 25, 2018

(30) Foreign Application Priority Data

Apr. 25, 2017 (KR) .................. 10-2017-0053102

(51) Int. Cl.
*G06N 20/00* (2019.01)
*G06F 8/30* (2018.01)
*G06F 15/76* (2006.01)
*H04L 29/06* (2006.01)
(Continued)

(52) U.S. Cl.
CPC ........... *H04L 69/08* (2013.01); *G06F 8/30* (2013.01); *G06F 8/425* (2013.01); *G06F 15/76* (2013.01); *G06N 20/00* (2019.01); *H04L 29/06068* (2013.01); *H04L 29/06163* (2013.01); *H04L 63/1433* (2013.01); *H04L 69/02* (2013.01);
(Continued)

(58) Field of Classification Search
None
See application file for complete search history.

(56) References Cited

U.S. PATENT DOCUMENTS

2003/0050915 A1* 3/2003 Allemang ........... G06F 16/9024
2009/0199204 A1* 8/2009 Frank .................. G06F 9/54
                                                              719/313
(Continued)

FOREIGN PATENT DOCUMENTS

JP        2006-11683 A       1/2006
KR    10-2008-0058609 A      6/2008
KR    10-2010-0073135 A      7/2010

*Primary Examiner* — Sargon N Nano
*Assistant Examiner* — Christopher B Robinson
(74) *Attorney, Agent, or Firm* — NSIP Law (57) ABSTRACT

A protocol model generator according to the present disclosure includes: a memory in which a protocol model generating program is stored; and a processor configured to execute the program. Herein, upon execution of the program, the processor extracts multiple strings from a binary corresponding to a protocol, generates a message pool including multiple candidate messages to be used in the protocol corresponding to the binary on the basis of the extracted multiple strings, and generates a protocol model corresponding to the protocol and configured to include nodes corresponding to the respective candidate messages included in the message pool. Further, the candidate messages include messages generated on the basis of the strings and response messages generated corresponding to the messages, and the protocol model is generated including one or more nodes and transition information between the nodes.

9 Claims, 8 Drawing Sheets (51) Int. Cl.
*G06F 8/41* (2018.01)
*H04L 29/08* (2006.01)
(52) U.S. Cl.
CPC .............. *H04L 69/03* (2013.01); *H04L 69/18* (2013.01); *H04L 69/30* (2013.01)

(56) References Cited

U.S. PATENT DOCUMENTS

| | | | |
|---|---|---|---|
| 2010/0050186 A1* | 2/2010 | Shimizu .............. | G06F 11/3419 719/316 |
| 2014/0201838 A1* | 7/2014 | Varsanyi ............... | G06F 21/552 726/23 |

* cited by examiner

PROTOCOL MODEL GENERATOR AND MODELING METHOD THEREOF

CROSS-REFERENCE TO RELATED APPLICATION

This application claims the benefit under 35 USC 119(a) of Korean Patent Application No. 10-2017-0053102 filed on Apr. 25, 2017, in the Korean Intellectual Property Office, the entire disclosures of which are incorporated herein by reference for all purposes.

TECHNICAL FIELD

The present disclosure relates to a protocol model generator and a modeling method thereof.

BACKGROUND

A protocol model is generated on the basis of messages input through a server or a client and transition information between the messages. Further, the protocol model may be used to analyze performance and vulnerabilities of a network protocol.

According to a conventional method for generating a protocol model, a protocol model has been generated by analyzing a sample input value for protocol test or a trace. The conventional method requires experts on the corresponding protocol. Further, the conventional method requires a manual operation to generate the sample input value or generate the trace. Further, the conventional method is difficult to have a state machine with extensive coverage because the range of sample input or network trace input is frequently used by humans.

PRIOR ART DOCUMENT

Korean Laid-open Publication No. 10-2008-0058609 (entitled "Unification-based type wireless LAN protocol analysis apparatus, analysis method thereof, and practice teaching method thereof")

SUMMARY

In view of the foregoing, the present disclosure provides a protocol model generator capable of automatically generating a protocol model on the basis of a message extracted from a binary and a modeling method thereof.

However, problems to be solved by the present disclosure are not limited to the above-described problems. There may be other problems to be solved by the present disclosure.

According to a first aspect of the present disclosure, a protocol model generator includes: a memory in which a protocol model generating program is stored; and a processor configured to execute the program. Herein, upon execution of the program, the processor extracts multiple strings from a binary corresponding to a protocol, generates a message pool including multiple candidate messages to be used in the protocol corresponding to the binary on the basis of the extracted multiple strings, and generates a protocol model corresponding to the protocol and configured to include nodes corresponding to the respective candidate messages included in the message pool. Further, the candidate messages include messages generated on the basis of the strings and response messages generated corresponding to the messages, and the protocol model is generated including one or more nodes and transition information between the nodes.

According to a second aspect of the present disclosure, a modeling method of a protocol model generator includes: extracting multiple strings to be used in a protocol from a binary corresponding to the protocol; generating a message pool including multiple candidate messages on the basis of the extracted multiple strings; and generating a protocol model corresponding to the protocol and configured to include nodes corresponding to the respective candidate messages included in the message pool. Herein, the candidate messages include messages generated on the basis of the strings and response messages generated corresponding to the messages, and the protocol model is generated including one or more nodes and transition information between the nodes.

According to the present disclosure, it is possible to automatically generate a protocol model through a binary corresponding to a protocol without prior knowledge of the protocol, analysis of information about the protocol, or a test using a sample. Further, according to the present disclosure, it is possible to infer various protocol states and messages of the protocol and thus possible to provide an effective test base. Further, according to the present disclosure, it is possible to find state machines with extensive coverage because they are modeled and tested up to input ranges that people do not actually use.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 5A to FIG. 5C are example diagrams of a protocol model in accordance with various embodiments described herein.

DETAILED DESCRIPTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Hereinafter, a protocol model generator 100 in accordance with an embodiment of the present disclosure will be described with reference to FIG. 1 to FIG. 5C.

Figure 1:
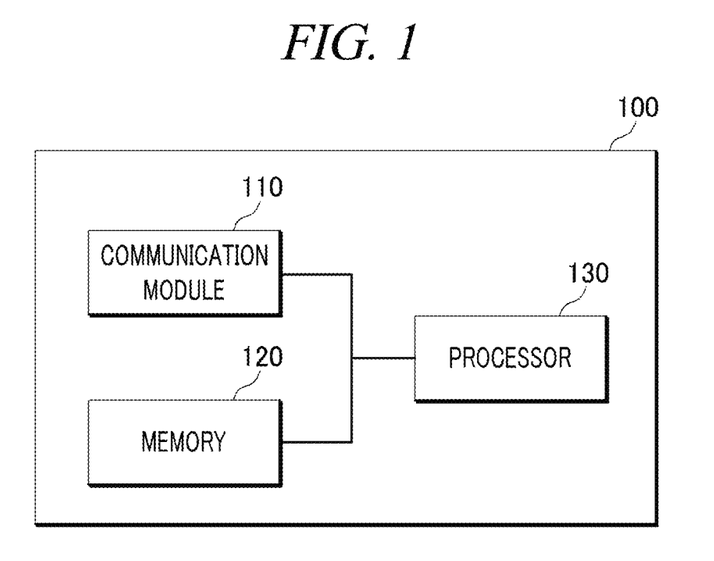
FIG. 1 is a block diagram of a protocol model generator in accordance with various embodiments described herein.

FIG. 1 is a block diagram of the protocol model generator 100 in accordance with an embodiment of the present disclosure.

The protocol model generator 100 may automatically generate a protocol model which can be used to test vulnerabilities of a specific protocol on the basis of messages collected from a binary. Herein, the messages may include request messages and response messages exchanged between a server 320 and a client 310.

The server 320 and the client 310 are distinguished from each other on the basis of characteristics of the messages for convenience. For example, the server 320 refers to a computing device 100 that provides a service or information and the client 310 refers to the computing device that receives the service or information from the server 320.

Further, the server 320 or the client 310 may be a virtual machine installed as software in the protocol model generator 100 or the separate computing device 100, but may not be limited thereto.

In an additional embodiment, the protocol model generator 100 may be included in the server 320. For example, the protocol model generator 100 may be installed as a virtual machine or an application program in the server 320, but may not be limited thereto.

Referring to FIG. 1 again, the protocol model generator 100 may include a communication module 110, a memory 120, and a processor 130.

The communication module 110 may receive messages exchanged between the server 320 and the client 310.

The memory 120 stores a protocol model generating program therein. The protocol model generating program may include a pre-processing module 230 and a modeling module.

The processor 130 may generate a message pool using the pre-processing module 230 included in the protocol model generating program. Further, the processor 130 may generate a protocol model using the message pool and the modeling module. Hereinafter, a process for generating the message pool will be described in detail with reference to FIG. 2 and a process for modeling the protocol model will be described in detail with reference to FIG. 3.

Figure 2:
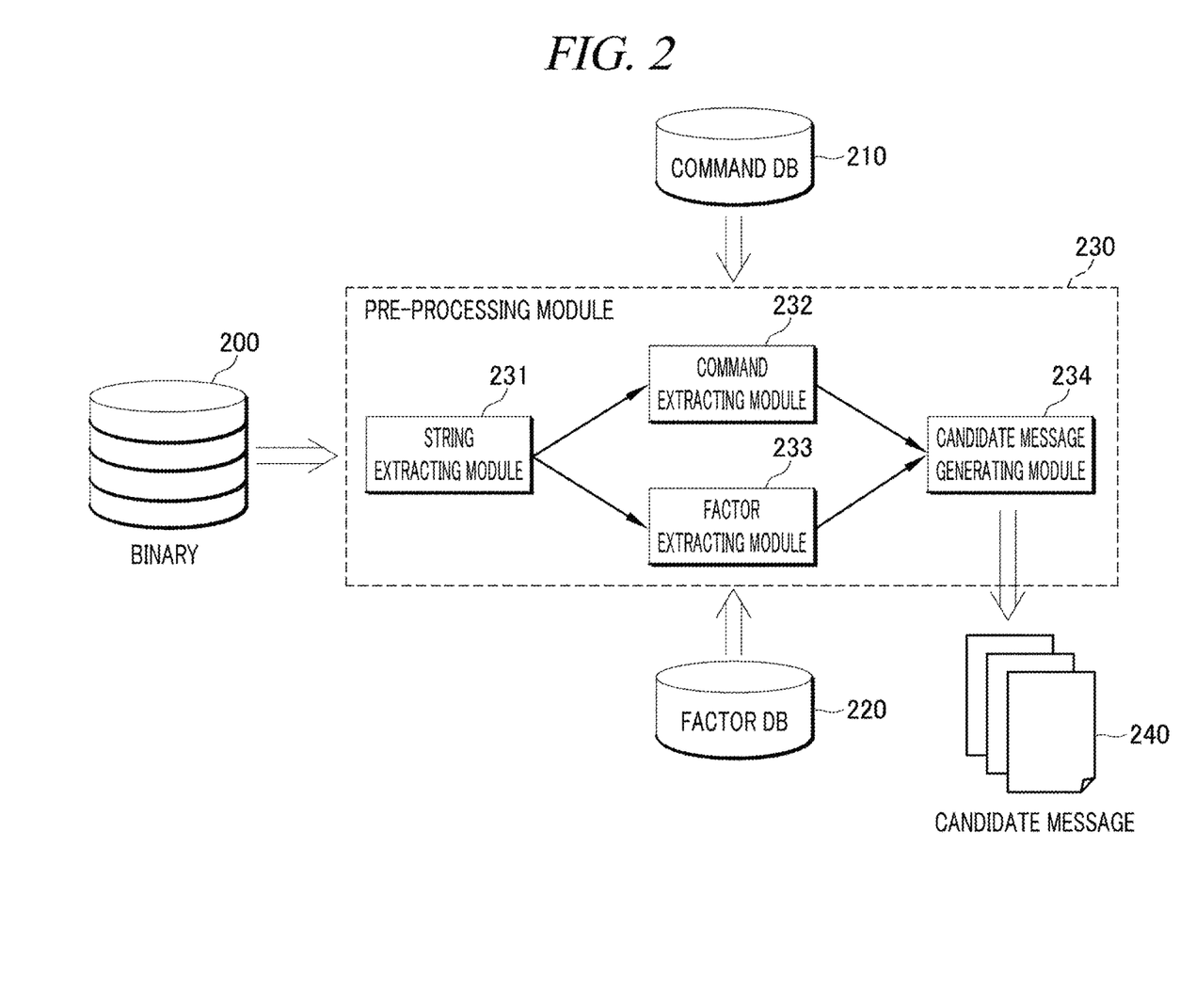
FIG. 2 is a block diagram of a pre-processing module in accordance with various embodiments described herein.

FIG. 2 is a block diagram of the pre-processing module 230 in accordance with an embodiment of the present disclosure.

The pre-processing module 230 included in the protocol model generating program may include a string extracting module 231, a command extracting module 232, a factor extracting module 233, and a candidate message generating module 234.

The processor 130 may extract strings from one or more binaries 200 through the string extracting module 231. Herein, the binary 200 may be a system program, an application program or a file relevant to a network, but may not be limited thereto. For example, the binary 200 may be an execution file for executing a file transfer protocol (FTP) or a file corresponding to a transmission control protocol (TCP).

In this case, the processor 130 may extract strings from the binaries 200 on the basis of reverse engineering. Further, the processor 130 may filter a string which can correspond to a command or a factor among the extracted strings.

The processor 130 may extract a command from the extracted strings through the command extracting module 232. In this case, the processor 130 may extract a string matched with one or more commands included in a command database 210 as the command.

Further, the processor 130 may extract multiple factors from the strings by matching the extracted strings with one or more factors included in a factor database 220 through the factor extracting module 130.

As such, the processor 130 may extract multiple commands and multiple factors from multiple strings extracted from the binaries 200. Then, the processor 130 may generate candidate messages 240 which can be used in a protocol corresponding to the binaries 200 by combination of the multiple commands and the multiple factors through the candidate message generating module 234.

Figure 3:
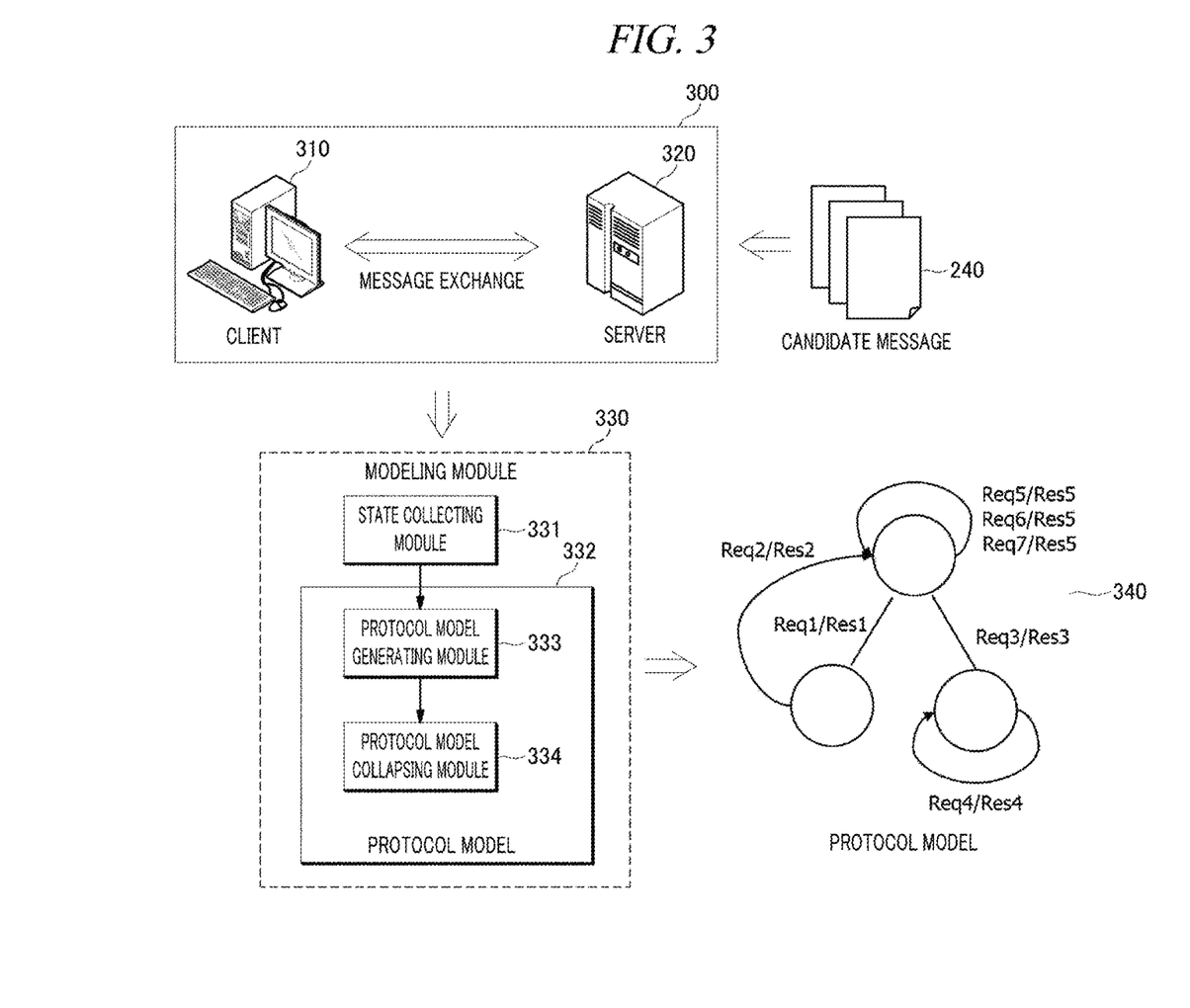
FIG. 3 is a block diagram of a modeling module in accordance with various embodiments described herein.

FIG. 3 is a block diagram of a modeling module 330 in accordance with an embodiment of the present disclosure.

Herein, the modeling module 330 may include a state collecting module 331 and a protocol model generating module 332. The protocol model generating module 332 may include a protocol model expanding module 333 and a protocol model collapsing module 334. The modeling module 330 may further include a message exchanging module 300.

After the processor 130 generates the message pool including the multiple candidate messages through the pre-processing module 230, it performs communication between the server 320 and the client 310 through the message exchanging module 300 using the generated candidate messages. Further, the processor 130 may receive response messages corresponding to the candidate messages and generate message pairs.

In this case, each message included in the message pool may be generated corresponding to a state and transition information about the state.

The state is generated during the communication between the server 320 and the client 310 using the protocol, and may include "start", "wait", "process", and "complete". Further, the transition information refers to information required to change a state.

For example, if the protocol is a TCP, a process "3-handshake" is performed to transfer messages in order of "SYN", "SYNACK", and "ACK" between the server 320 and the client 310. That is, a device that transfers the message "SYN" may be changed in state to "SYN transferred" on the basis of transition information indicating that the message "SYN" was transferred. Further, the device waits for receiving the message "SYNACK". After the device receives the message "SYNACK", it may transfer the message "ACK". In this case, the device may be changed in state to "HANDSHAKE completed". Herein, the transition information may be the receipt of the message "SYNACK" and the transfer of the message "ACK".

The message pair may be configured as "(message, response message)". Further, the message pair may be transition information indicative of transition from a specific state to another state. Herein, any collected message pair may be matched with a level. In this case, the level may be set on the basis of a hierarchical structure of each state. Further, the level may have an inverse relationship with a depth of the state.

For example, a state corresponding to a first message transferred first in an initial state may be a first level, and a state corresponding to a second message transferred subsequent to the first message may be a second level.

Specifically, the processor 130 may cause the server 320 to transfer the first message to the client 310. The server 320 may transfer the first message to the client 310. The client 310 that receives the first message from the server 320 may generate a first response message corresponding to the first message. Then, the client 310 may transfer the first response message to the server 320. The processor 130 may collect the first response message from the client 310 and match the first message with the first response message to generate a massage pair "(first message, first response message)".

Otherwise, the processor 130 may cause the client 310 to transfer the second message to the server 320. The client 310 may transfer the second message to the server 320. The server 320 that receives the second message from the client 310 may generate a second response message corresponding to the second message. Then, the server 320 may transfer the second response message to the client 310. The processor 130 may collect the second response message from the server 320 and match the second message with the second response message to generate a message pair "(second message, second response message)".

If a message pair is generated, the processor 130 may add the message pair to the protocol model and perform protocol modeling through the modeling module 330.

In this case, the protocol model may be based on a tree data structure or a modified tree data structure included in a node available for recursive references. Further, the protocol model may include a node corresponding to a state and a link generated on the basis of transition information between states.

For example, a specific node included in the protocol model may represent a specific state in the corresponding protocol and a link may correspond to transition information indicative of transition from the state to another state.

Specifically, the processor 130 may generate a protocol model including an initial state node. Further, the processor 130 may select a first message as a first-level message.

The processor 130 may receive a first response message corresponding to the first message from the server 320 and the client 310 to generate a first message pair. Further, the processor 130 may add the generated message pair to the protocol model. In this case, since only an initial state is included in the protocol model, the processor 130 may generate a first node and add the first node to a level subsequent to the initial state node in the protocol model or replace the initial state node with the first node in order for the protocol model to include a state corresponding to the first message pair.

The processor 130 may select a second message corresponding to a second level which is a subsequent level on the basis of the first response message. Then, the processor 130 may receive a second response message corresponding to the second message from the server 320 and the client 310 to generate a second message pair. The processor 130 may compare the first node included in the protocol model with the second message pair. In this case, if the first node is not matched with the second message pair, the processor 130 may generate a second node corresponding to the second message pair and add the second node as a child node of the first node.

Further, if a third message is present as a second-level message, the processor 130 may transfer the third message to be exchanged between the server 320 and the client 310. Further, the processor 130 may receive a third response message corresponding to the third message to generate a third message pair. The processor 130 may compare the first node included in the protocol model with the third message pair. Further, the processor 130 may compare the second node with the third message pair.

In this case, if there is a node matched with the third message pair, the processor 130 may not add a node for the third message pair. However, if the first node or the second node is not matched with the third message pair, the processor 130 may generate a third node corresponding to the third message pair and add the third node as a child node of the first node. That is, the third node may be added as a brother node of the second node.

As described above, the processor 130 may add a candidate message for each level corresponding to a protocol into a protocol model.

If a protocol model for all of the candidate messages is generated, the processor 130 may optimize the generated protocol model. Specifically, the processor 130 may search for the same node by comparing nodes included in the protocol model. Herein, the same node may refer to a node including a child node in the same state. Then, the processor 130 may optimize the protocol model to include only a unique node by merging the same nodes.

In an additional embodiment, the processor 130 may compare a specific node with lower-level nodes of the specific node to search for the same node as the specific node among the lower-level nodes of the specific node.

Figure 4:
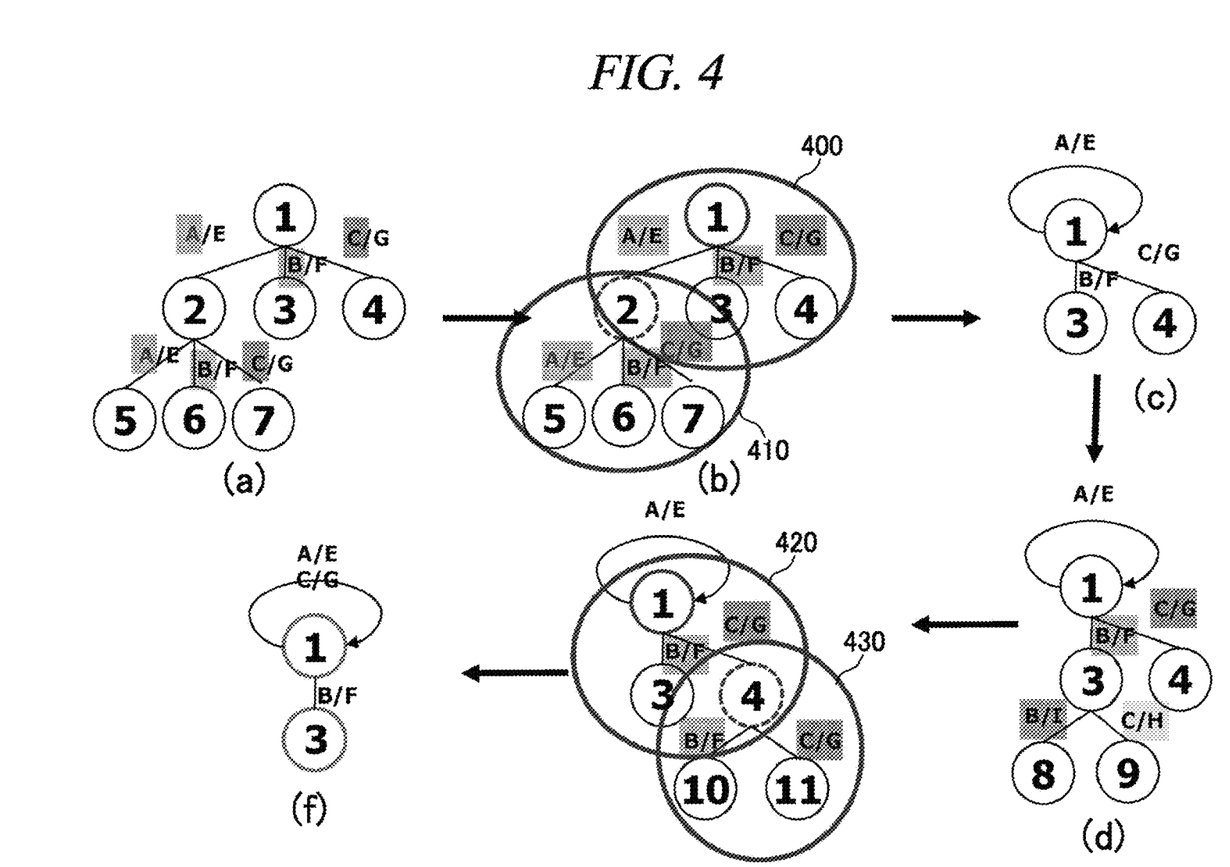
FIG. 4 is an example diagram provided to explain a process for optimizing a protocol model in accordance with various embodiments described herein.

FIG. 4 is an example diagram provided to explain a process for optimizing a protocol model in accordance with an embodiment of the present disclosure.

Referring to FIG. 4A, the processor 130 may compare a detailed model 400 corresponding to a first node and a detailed model 410 corresponding to a second node included in a protocol model. In this case, the detailed model 400 corresponding to the first node may include the first node as a root node. Further, the detailed model 400 corresponding to the first node may include the second node, a third node, and a fourth node, which are child nodes of the first node, as child nodes. Furthermore, the first node transfers a message "A" and receives a message "B" for transition to the second node. Further, the first node transfers the message "B" and receives a message "F" for transition to the third node, and transfers a message "C" and receives a message "G" for transition to the fourth node.

Likewise, the detailed model 410 corresponding to the second node may include the second node as a root node, and may include a fifth node, a sixth node, and a seventh node, which are child nodes of the second node, as child nodes. Further, the second node transfers the message "A" and receives the message "B" for transition to the fifth node. Furthermore, the second node transfers the message "B" and receives the message "F" for transition to the sixth node, and transfers the message "C" and receives the message "G" for transition to the seventh node.

As such, the processor 130 may determine that the detailed model 400 corresponding to the first node and the detailed model 410 corresponding to the second node are the same nodes on the basis of the states and transition information corresponding to the detailed model 400 and the detailed model 410.

Referring to FIG. 4C, the processor 130 may merge the detailed model 400 corresponding to the first node with the detailed model 410 corresponding to the second node. Further, the processor 130 may convert the first node into a node available for recursive references in consideration of a transition state from the first node to the second node.

Further, the processor 130 may compare the third node with the other nodes. In this case, since there is no node matched with the third node, the processor 130 may compare the fourth node which is a subsequent node with the other nodes.

In this case, the detailed model 420 of the first node is matched with a detailed model 430 of the fourth node, the processor 130 may merge the detailed model 420 of the first node with the detailed model 430 of the fourth node and add transition information to the first node.

Through the above-described process, the processor 130 may optimize a protocol model on the basis of transition information between a node and a lower-level node as illustrated in FIG. 4F. Referring to FIG. 4F again, the protocol model can be optimized to include only a node whose state and transition information are unique.

Figure 5A:
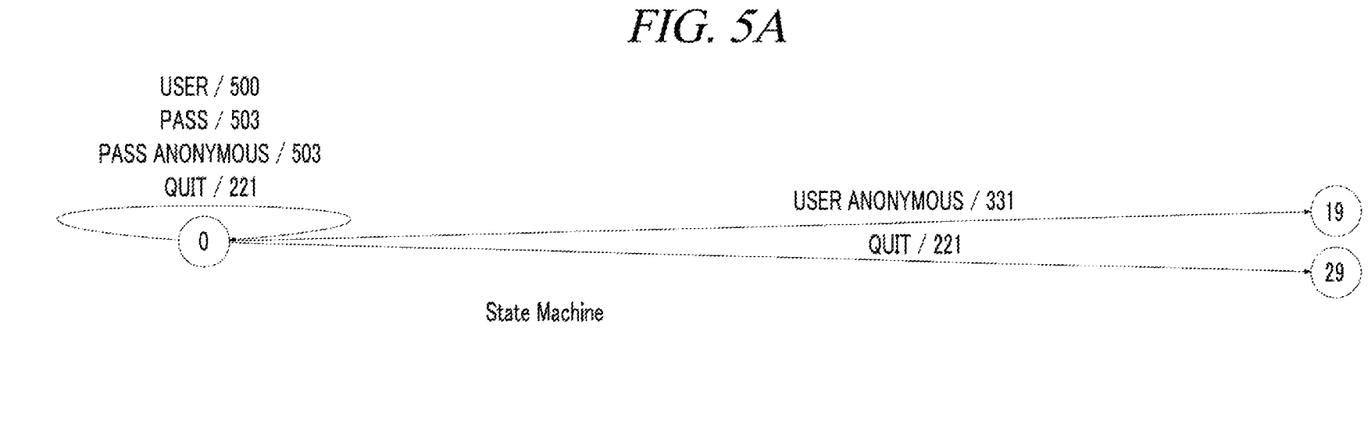
Figure 5B:
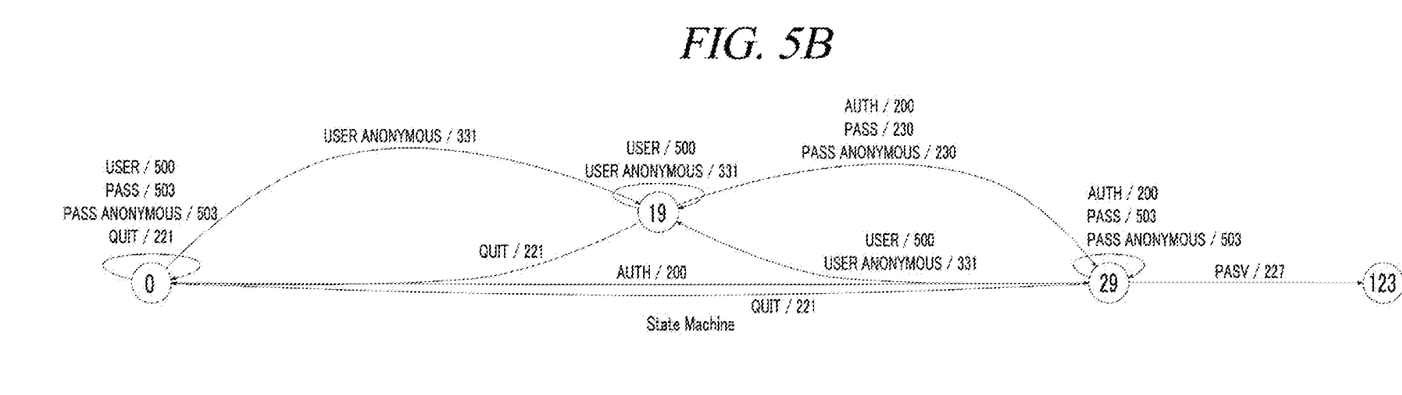
Figure 5C:
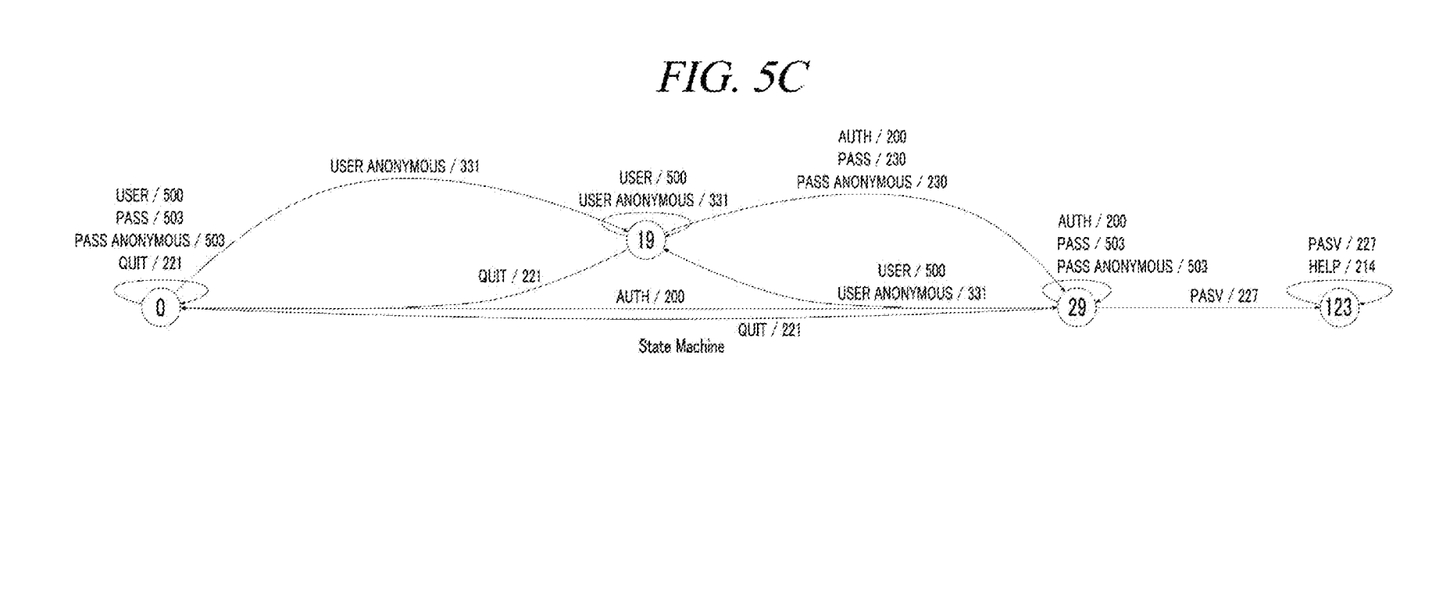

FIG. 5A to FIG. 5C are example diagrams of a protocol model in accordance with an embodiment of the present disclosure.

Referring to FIG. 5A, the processor 130 may generate a protocol model for a certain protocol to include a first level and a second level. Further, the processor 130 may expand the protocol model using a candidate message corresponding to a third level and a candidate message corresponding to a fourth level as shown in FIG. 5B and FIG. 5C.

Hereinafter, a modeling method in the protocol model generator 100 in accordance with an embodiment of the present disclosure will be described with reference to FIG. 6.

Figure 6:
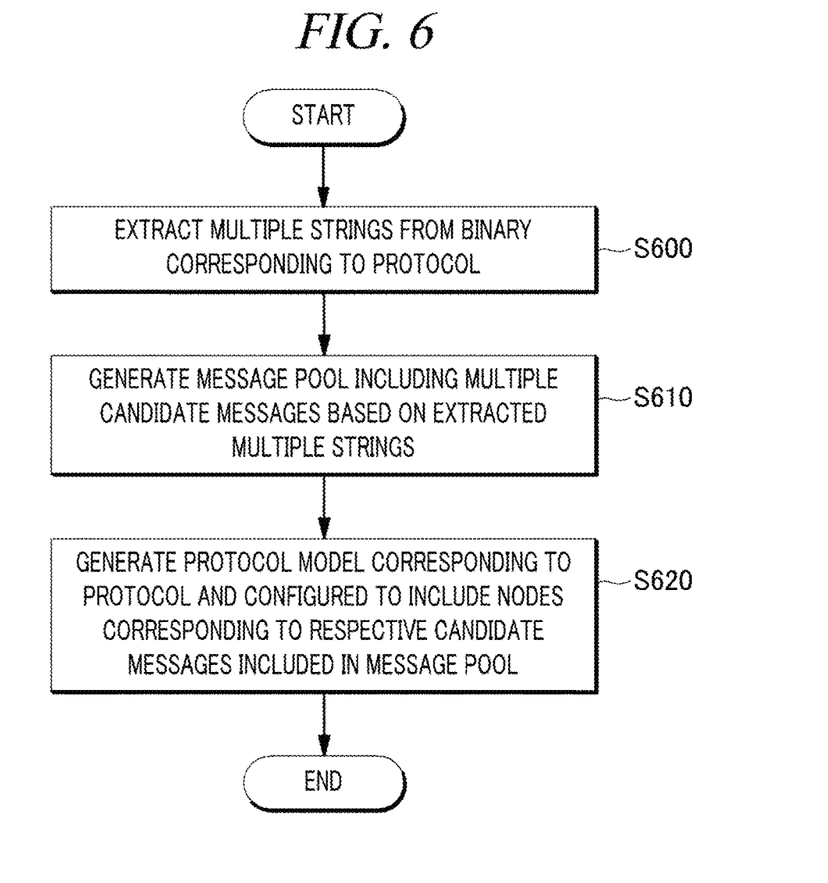
FIG. 6 is a flowchart illustrating a modeling method in a protocol model generator in accordance with various embodiments described herein.

FIG. 6 is a flowchart illustrating a modeling method in the protocol model generator 100 in accordance with an embodiment of the present disclosure.

The protocol model generator 100 may extract multiple strings from a binary corresponding to a protocol (S600).

Specifically, the protocol model generator 100 may extract multiple commands from the multiple strings. Further, the protocol model generator 100 may extract multiple factors from the multiple strings. The protocol model generator 100 may generate multiple candidate messages on the basis of the multiple commands and the multiple factors.

The protocol model generator 100 may generate a message pool including multiple candidate messages on the basis of the extracted multiple strings (S610). In this case, the candidate messages include messages generated on the basis of the strings and response messages generated corresponding to the messages.

The protocol model generator 100 may generate a protocol model corresponding to the protocol and configured to include nodes corresponding to the respective candidate messages included in the message pool (S620). In this case, the protocol model is generated including one or more nodes and transition information between the nodes.

Specifically, the protocol model generator 100 may compare the nodes included in the protocol model with the respective candidate messages. Further, the protocol model generator 100 may generate a node corresponding to each candidate message on the basis of a result of comparison. The protocol model generator 100 may add the generated node to the protocol model.

Further, the protocol model generator 100 may generate a detailed model corresponding to any one of the multiple nodes included in the protocol model. Furthermore, the protocol model generator 100 may select another detailed model matched with the detailed model and merge them. In this case, the detailed model may include the any one node as a root node and may be generated including lower-level nodes of the root node and transition information.

Meanwhile, the protocol model generator 100 may generate a message pair corresponding to each candidate message on the basis of message exchange for each candidate message between the server 320 and the client 310 to generate the message pool. Herein, the message pair may include a candidate message and a response message corresponding to the candidate message. Then, the protocol model generator 100 may generate a node corresponding to the message pair to generate a protocol model.

According to the protocol model generator 100 and the modeling method in accordance with an embodiment of the present disclosure, it is possible to automatically generate a protocol model through a binary corresponding to a protocol without prior knowledge of the protocol, analysis of information about the protocol, or a test using a sample. Further, according to the protocol model generator 100 and the modeling method, it is possible to infer various protocol states and thus possible to provide an effective test base.

The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage. The computer storage medium includes all volatile/non-volatile and removable/non-removable media embodied by a certain method or technology for storing information such as computer-readable instruction code, a data structure, a program module or other data.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Protocol model generator
110: Communication module
120: Memory
130: Processor

We claim:

1. A protocol model generator, which generates one or more protocol models that are used for testing vulnerability in the protocol model, comprising:

a memory in which a protocol model generating program is stored; and a processor configured to execute the program, wherein upon execution of the program, the processor
extracts multiple strings from a binary corresponding to a protocol,
extracts multiple commands from the multiple strings,
extracts multiple factors from the multiple strings,
generates multiple candidate messages on the basis of the multiple commands and the multiple factors,
generates a message pool including the multiple candidate messages to be used in the protocol corresponding to the binary,
generates a message pair corresponding to each of the candidate messages on the basis of message exchange for each of the candidate messages between a server and a client,
generates a node corresponding to the message pair, and
generates a protocol model corresponding to the protocol and configured to include the node, and wherein the candidate messages include messages generated on the basis of the strings and response messages generated corresponding to the messages, the message pair includes the candidate message and a response message corresponding to the candidate message, and the protocol model is generated including one or more nodes and transition information between the nodes.

2. The protocol model generator of claim 1,
wherein the processor compares the nodes included in the protocol model with the respective candidate messages, generates a node corresponding to each candidate message on the basis of a result of comparison, and adds the generated node to the protocol model to expand the protocol model.

3. The protocol model generator of claim 2,
wherein if there is no node matched with a first candidate message among the one or more nodes, the processor generates a node corresponding to the first candidate message and adds the node to the protocol model.

4. The protocol model generator of claim 1,
wherein after the protocol model is generated, the processor optimizes the protocol model by generating a detailed model corresponding to any one of the multiple nodes included in the protocol model, selecting another detailed model matched with the detailed model, and merging the detailed model with the matched detailed model, and
the detailed model includes the any one node as a root node and is generated including lower-level nodes of the root node and transition information.

5. The protocol model generator of claim 4,
wherein the processor selects the matched detailed model on the basis of information about transition to the lower-level nodes included in the detailed model.

6. A modeling method of a protocol model generator, which generates one or more protocol models that are used for testing vulnerability in the protocol model, comprising:
extracting multiple strings to be used in a protocol from a binary corresponding to the protocol;
extracting multiple commands from the multiple strings;
extracting multiple factors from the multiple strings;
generating multiple candidate messages on the basis of the multiple commands and the multiple factors;
generating a message pool including multiple candidate messages to be used in the protocol corresponding to the binary;
generates a message pair corresponding to each of the candidate messages on the basis of message exchange for each of the candidate messages between a server and a client;
generates a node corresponding to the message pair; and
generating a protocol model corresponding to the protocol and configured to include the node,
wherein the candidate messages include messages generated on the basis of the strings and response messages generated corresponding to the messages,
the message pair includes the candidate message and a response message corresponding to the candidate message, and
the protocol model is generated including one or more nodes and transition information between the nodes.

7. The modeling method of claim 6,
wherein the generating of the protocol model includes:
comparing the nodes included in the protocol model with the respective candidate messages;
generating a node corresponding to each candidate message on the basis of a result of comparison; and
adding the generated node to the protocol model to expand the protocol model.

8. The modeling method of claim 6, further comprising:
after the generating of the protocol model,
generating a detailed model corresponding to any one of the multiple nodes included in the protocol model; and
merging the detailed model with the matched detailed model to optimize the protocol model,
wherein the detailed model includes the any one node as a root node and is generated including lower-level nodes of the root node and transition information.

9. A non-transitory computer-readable storage medium that stores a program to perform a method of claim 6 on a computer.

* * * * *